June 3, 1941.   R. G. BOELTER   2,243,894
PLASTER BOLT OR THE LIKE
Filed Dec. 18, 1939
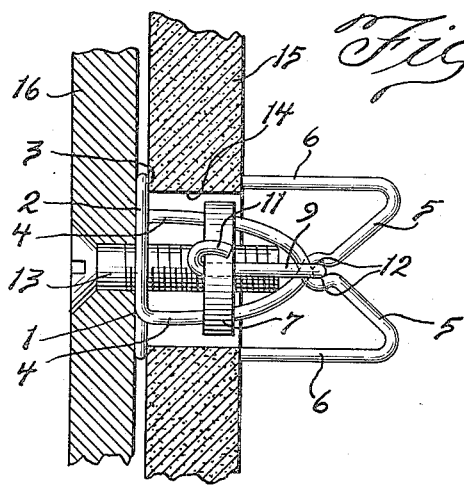
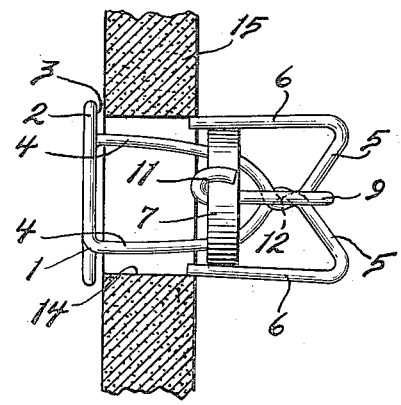
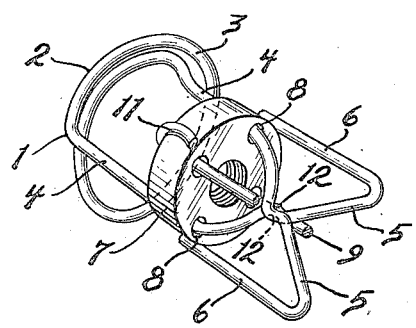
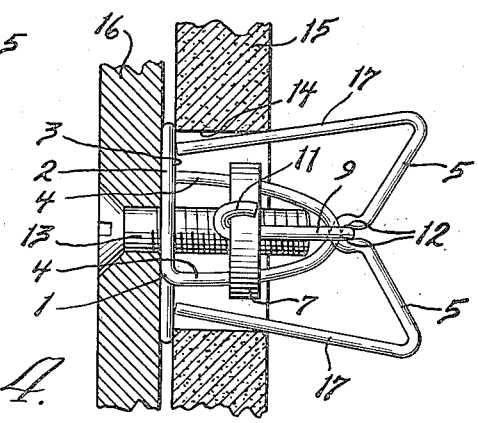
Inventor:
Rudolph G. Boelter
By: Robert F. Miehle, Jr.
Atty.

Patented June 3, 1941

2,243,894

UNITED STATES PATENT OFFICE 2,243,894

PLASTER BOLT OR THE LIKE

Rudolph G. Boelter, Chicago, Ill., assignor of one-half to Richard Skoglund, Geneva, Ill.

Application December 18, 1939, Serial No. 309,717

4 Claims. (Cl. 85—2.4)

My invention relates to a securing bolt for wall plaster or facing although not limited to this use alone.

The general object of the invention resides in the provision of a novel, simple and effective securing bolt which is adapted for convenient application, and which provides for the convenient fastening of articles or material to wall plaster or the like in that it involves a base or anchor structure which of itself is fixedly secured to the wall plaster or the like with obvious convenience during the fastening operation, the invention also contemplating the ready removal of the base or anchor structure.

With this object in view my invention consists in certain features of novelty in the construction, combination and arrangement of parts by which the said object and certain other objects, hereinafter appearing, are effected, all as fully described with reference to the accompanying drawing and more particularly pointed out in the appended claims.

In the said drawing—

Figure 1 is a side elevation of a bolt embodying my invention and showing it installed;

Figure 2 is a similar elevation of the base or anchor structure of my bolt showing it partially installed;

Figure 3 is a perspective view of the aforesaid base or anchor structure; and

Figure 4 is a side elevation of a modified form of my invention.

Referring to Figures 1, 2 and 3 of the drawing, a securing element 1 is formed of a length of wire having its intermediate portion coiled as designated at 2 to provide an annular shoulder 3. Portions of the wire extend from the coiled portion 2 in diametrically opposite relation and consist of spaced sections 4 adjoining the coiled portion, then oppositely extending sections 5 arranged diagonally of the plane of the shoulder 3 in crossed relation, and then spaced terminal sections 6 extending toward the coil 2 and shoulder 3. The portions comprising the sections 4, 5 and 6 constitute securing means and are expansible radially of the axis of the coil 2 and shoulder 3 for the purpose hereinafter appearing.

A nut 7 is mounted for limited movement axially of the annular shoulder 3 by means of diametrically opposite bores 8 slidably engaged on the sections 4. A wire yoke 9 has its ends secured with the nut 7 at diametrically opposite points thereon, as designated at 11, and is slidably engaged between the diagonal sections 5 for expanding the securing means comprising the sections 4, 5 and 6 with movement of the nut 7 relative thereto in the direction toward the shoulder 3. The sections 5 are provided with oppositely arranged notches 12 into which the yoke 9 engages to lock the securing means comprising the sections 4, 5 and 6 in expanded condition, as shown in Figure 1. A headed screw 13 is screw-threaded into the nut 7 and extends centrally through the coil 2 and shoulder 3, this screw and the nut providing a clamping device operative normal to the shoulder 3 and extending centrally therethrough.

The securing element 1 and nut 7 carried thereby is installed in an aperture 14 in a wall plaster structure 15 or the like by inserting the securing means, comprising the sections 4, 5 and 6, of the securing element 1 into the aperture 14 while the securing means is in contracted condition as shown in Figure 2. When the securing element 1 is fully inserted, the shoulder 3 engages facewise against the structure 15 thus limiting insertion of the securing element as shown in Figure 1. The nut 7 is then moved by means of the screw 13, toward the shoulder 3, to its outer position as shown in Figure 1, thus expanding the securing means and locking the same in expanded condition by reason of the yoke 9 engaging the diagonal sections 5 and the notches 12, in which expanded condition the ends of the terminal sections 6 engage the structure 15 in opposition to the shoulder 3 and fixedly secure the base or anchor structure involving the element 1 and the nut 7 on the structure 15.

After this installation, any article or material 16 may be conveniently secured on the structure 15 by means of the screw 13 screwthreaded into the nut 7 as shown in Figure 1.

It will be observed that while the base or anchor structure is fixedly secured on the structure 15, it may be conveniently removed by moving the nut 7 and yoke 9 away from the shoulder 3, thus unlocking the securing means of the element 1 and permitting it to contract.

Referring to Figure 4, the structure therein is, with one exception, identical with that of Figures 1, 2 and 3, and the same reference characters are applied to identical parts which function in the same manner as hereinbefore described. The aforesaid exception consists in that the terminal sections of the securing means of the element 1 of Figure 4 are extended to the shoulder 3 and are slanted, as designated at 17, to have a wedge engagement with the aperture 14 of the structure 15.

While I have thus described my invention, I do not wish to be limited to the precise details described as changes may be readily made without departing from the spirit of my invention, but having thus described my invention I claim as new and desire to secure by Letters Patent the following:

1. In a device of the character described, the combination of a securing element comprising an annular shoulder engageable facewise against an apertured structure and securing means connected with said shoulder and adapted for insertion in the aperture of said structure with said shoulder engaged against said structure and expansible radially of said aperture for securing engagement with said apertured structure, a clamping device operative normal to said shoulder and extending centrally therethrough and including a clamping member carried with said securing element for limited movement with reference thereto and normal to said shoulder, and means for positioning said securing means in expanded condition with movement of said clamping member toward said shoulder comprising two oppositely extending portions of said securing means arranged diagonally of the plane of said shoulder in crossed relation and an element carried with said clamping member and slidably engaged between said diagonally arranged portions.

2. In a device of the character described, the combination of a securing element comprising an annular shoulder engageable facewise against an apertured structure and securing means connected with said shoulder and adapted for insertion in the aperture of said structure with said shoulder engaged against said structure and expansible radially of said aperture for securing engagement with said apertured structure, a screw clamping device operative normal to said shoulder and extending centrally therethrough and including a screwthreaded nut carried with said securing element for limited movement with reference thereto and normal to said shoulder, and means for positioning and locking said securing means in expanded condition with movement of said nut toward said shoulder comprising two oppositely extending portions of said securing means arranged diagonally of the plane of said shoulder in crossed relation and a yoke fixed on said nut and slidably engaged between said diagonally arranged portions, said diagonally arranged portions being provided with oppositely arranged notches into which said yoke engages to lock said securing means in expanded condition.

3. In a device of the character described, the combination of a securing element formed of a length of wire having its intermediate portion coiled to form an annular shoulder and having portions extending from said coiled portion in diametrically opposite relation and providing securing means adapted for insertion in the aperture of an apertured structure with said shoulder engaged facewise against said structure, said extending portions being expansible radially of the axis of said coiled portion for securing engagement with said structure, a clamping device operative normal to said shoulder and extending centrally therethrough and including a clamping member slidably mounted on said extending portions, and means operative between said clamping member and said extending portions to effect securing expansion of said extending portions with slidable movement of said clamping member toward said shoulder.

4. In a device of the character described, the combination of a securing element formed of a length of wire having its intermediate portion coiled to form an annular shoulder and having portions extending from said coiled portion in diametrically opposite relation, said extending portions being formed to provide spaced sections adjoining said coiled portion, then oppositely extending sections arranged diagonally of the plane of said shoulder in crossed relation and then spaced terminal portions extending toward said coiled portion to provide securing means adapted for insertion in the aperture of an apertured structure with said shoulder engaged facewise against said structure, said extending portions being expansible radially of the axis of said coiled portion for securing engagement with said structure, a screw clamping device operative normal to said shoulder and extending therethrough including a screwthreaded member slidably mounted on said sections adjoining said coiled portion, and a yoke fixed on said screwthreaded member and slidably engaged between said diagonally arranged sections for expanding said extending portions with movement of said screwthreaded member toward said shoulder.

RUDOLPH G. BOELTER.